F3060 XR RE 4,963 REFERENCE SEARCH ROOM

BEST AVAILABLE COPY

L. YALE, Jr.

Improvement in Post-Office Letter-Boxes.

Re No. 4,963 Reissued July 9, 1872.

Witnesses:
H. C. Matteuberg
W. Lovell

Inventor:
Silas A. Brooks.
Administrator of the
Estate of Linus Yale Jr.
per J. M. Spencer
Atty

A.M. PHOTO-LITHOGRAPHIC CO. N.Y. (OSBORNE'S PROCESS.)

UNITED STATES PATENT OFFICE.

SILAS N. BROOKS, OF BERNARDSTOWN, MASSACHUSETTS, ADMINISTRATOR OF LINUS YALE, JR., DECEASED.

IMPROVEMENT IN POST-OFFICE LETTER-BOXES.

Specification forming part of Letters Patent No. 119,212, dated September 19, 1871; reissue No. 4,963, dated July 9, 1872.

*To all whom it may concern:*

Be it known that LINUS YALE, Jr., deceased, late of Shelburne Falls, in the county of Franklin and State of Massachusetts, during his lifetime invented a new and useful Improvement in Doors for Post-Office Boxes; and I, SILAS N. BROOKS, administrator of the estate of the said LINUS YALE, Jr., deceased, do hereby declare the following to be a full, clear and exact description thereof, sufficient to enable others skilled in the arts to understand, make, and use the same, reference being had to the accompanying drawing forming part of this specification, in which—

Figure 1:
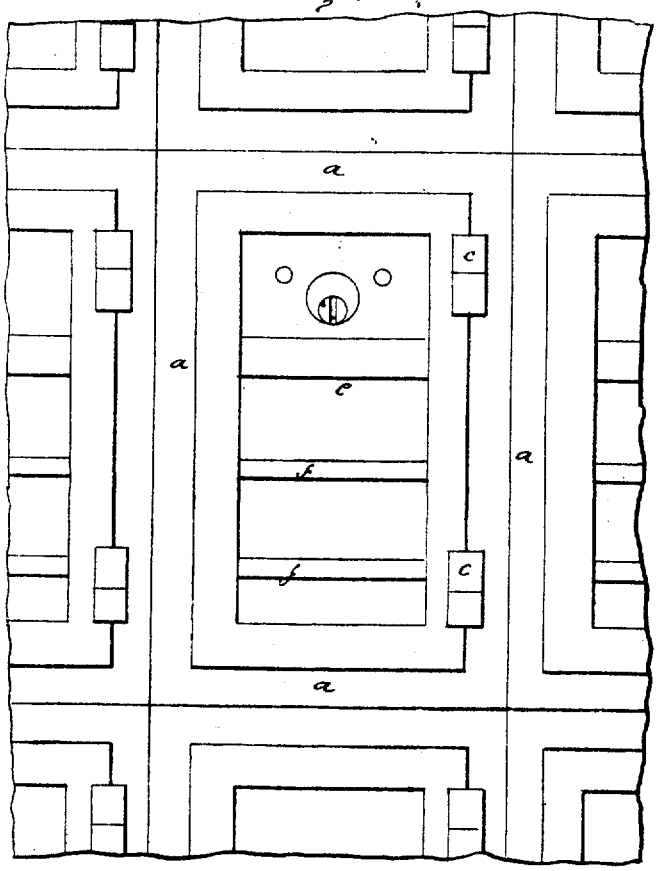
Figure 2:
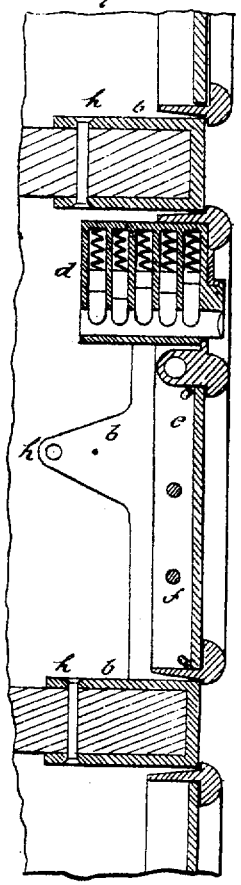
Figure 3:
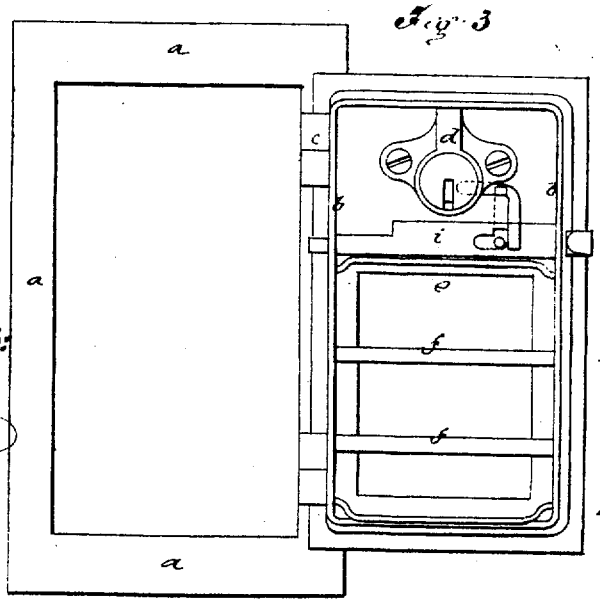

Figure 1 is an elevation taken from the front or delivery side of a series of boxes. Fig. 2 is a vertical section through the same, and Fig. 3 is a front elevation of a single box-frame with the door open.

This invention relates to an improvement in the fronts of post-office boxes; and consists in making said fronts, including the doors and box-frames, of metal, said box-frames being constructed so as to overlap and cover, in whole or in part, the front edges of the wooden pigeon-holes to which they are affixed.

The body of the boxes is to be made of wood in the usual manner—viz., a series of pigeon-holes—but the front of the box and the door-frame are made of iron or other suitable metal. Each door-frame or box-front is so made that it aids in covering the edge of the wooden partition or pigeon-holes and is connected with the other frames above, below, and on each side of it in such manner that the frames will make a continuous frontage, no part of which can be removed from the outside without pulling down other parts. Each frame, made as before stated of metal, has all around it a flange, *a a*, which protects the outside or edges of the wood-work. The sides of the frames *b b* enter and fit closely against the wood, forming the pigeon-holes, and may be continuous or notched out at intervals, and each frame has attached to it one leaf of two or more hinges, *c c*. The door may be of any desirable metal, solid where the lock *d* is attached, and having an opening, *e*, below, in which a plate of glass is secured. I prefer to locate rods *f f* behind the plate, to prevent the introduction of a hand, if the glass be broken. The door is so constructed that when shut it enters within the frame so that it cannot be lifted from its hinges. When the frames are all in place each frame is riveted through the wood-work to its four neighbors, (see *h h*, Fig. 2,) and in this way form a continuous metal frontage. The door for each frame has a small spring-bolt, *i*, and a lock, *d*, attached to it, the two operating together and forming, in the hands of the postmaster, a perfect safeguard against all entrance to the box by means of the key, as is more particularly set forth in Letters Patent granted to me on the 24th day of October, 1871, and numbered 120,177.

What I claim as the invention of the said LINUS YALE, Jr., deceased, is—

1. The combination of several box-frames with each other and with pigeon-holes, as described, by means of rivets passing through the frames and the wood-work entering between the said frames, the combination being substantially as described.

2. The combination of two or more metallic frames and doors and locks with pigeon-holes, said frames having flanges, which protect and inclose wholly or in part the front edges of said pigeon-holes.

SILAS N. BROOKS,
*Administrator of the Estate of Linus Yale, Jr.*

Witnesses:
H. L. WATTENBERG,
G. M. PLYMPTON.